(12) United States Patent
Ahn et al.

(10) Patent No.: US 11,606,397 B2
(45) Date of Patent: Mar. 14, 2023

(54) SERVER AND OPERATING METHOD THEREOF

(71) Applicant: Hyperconnect Inc., Seoul (KR)

(72) Inventors: Sangil Ahn, Cheongju-si (KR); Yongje Lee, Seoul (KR)

(73) Assignee: Hyperconnect Inc., Seoul (KR)

( * ) Notice: Subject to any disclaimer, the term of this patent is extended or adjusted under 35 U.S.C. 154(b) by 678 days.

(21) Appl. No.: 16/275,449

(22) Filed: Feb. 14, 2019

(65) Prior Publication Data

US 2019/0281093 A1     Sep. 12, 2019

(30) Foreign Application Priority Data

Mar. 7, 2018    (KR) .................... 10-2018-0026935

(51) Int. Cl.
    *H04L 65/1083*    (2022.01)
    *G06F 16/71*    (2019.01)
    *G06F 16/73*    (2019.01)
    *H04L 65/1069*    (2022.01)
    *H04L 67/01*    (2022.01)

(52) U.S. Cl.
    CPC .......... *H04L 65/1083* (2013.01); *G06F 16/71* (2019.01); *G06F 16/73* (2019.01); *H04L 65/1069* (2013.01); *H04L 67/01* (2022.05)

(58) Field of Classification Search
    CPC . H04L 65/1083; H04L 65/1069; H04L 67/42; G06F 16/71; G06F 16/73
    USPC ........................................................ 709/227
    See application file for complete search history.

(56) References Cited

U.S. PATENT DOCUMENTS

| 8,812,519 B1 | 8/2014 | Bent |
| 8,867,849 B1 | 10/2014 | Kirkham et al. |
| 9,531,998 B1 * | 12/2016 | Farrell .................. H04N 7/147 |

(Continued)

FOREIGN PATENT DOCUMENTS

| CN | 101827317 A | 9/2010 |
| CN | 104737097 A | 6/2015 |

(Continued)

OTHER PUBLICATIONS

Extended European Search Report for Application No. 20192980.9, dated Sep. 28, 2020, 8 Pgs.

(Continued)

*Primary Examiner* — Normi Abedin
*Assistant Examiner* — Hien V Doan
(74) *Attorney, Agent, or Firm* — KPPB LLP

(57) ABSTRACT

An operating method of a server, comprising, mediating a video call session between a first terminal and a second terminal; receiving satisfaction information on the video call session of a user of the first terminal from the first terminal; preparing combination of a specific type of personal information about a user of the first terminal and facial characteristic information about a user of the second terminal; calculating a correlation between the combination and the satisfaction information corresponding to the combination; receiving a video call mediating request from a third terminal and from a plurality of candidate terminals, and predicting satisfaction information of a user of the third terminal with respect to each of the candidate terminals; and choosing a fourth terminal among the candidate terminals.

15 Claims, 8 Drawing Sheets

(56) References Cited

U.S. PATENT DOCUMENTS

| | | |
|---|---|---|
| 9,733,811 B2 | 8/2017 | Rad et al. |
| 10,384,136 B2 | 8/2019 | Chae et al. |
| 10,599,734 B2 | 3/2020 | Ahn et al. |
| 10,706,118 B1 | 7/2020 | Yang et al. |
| 10,810,276 B2 | 10/2020 | Ahn et al. |
| 10,984,488 B1 | 4/2021 | Colucci |
| 11,296,898 B2 | 4/2022 | Ahn et al. |
| 11,301,534 B2 | 4/2022 | Ahn et al. |
| 11,457,077 B2 | 9/2022 | Ahn et al. |
| 2004/0076280 A1 | 4/2004 | Ando et al. |
| 2004/0107144 A1 | 6/2004 | Short |
| 2005/0047576 A1 | 3/2005 | Hidesawa et al. |
| 2008/0080745 A1 | 4/2008 | Vanhoucke et al. |
| 2009/0271244 A1 | 10/2009 | Kalasapur et al. |
| 2011/0289433 A1 | 11/2011 | Whalin et al. |
| 2012/0004954 A1 | 1/2012 | Eisinger et al. |
| 2014/0040368 A1 | 2/2014 | Janssens |
| 2014/0074824 A1 | 3/2014 | Rad et al. |
| 2014/0172893 A1 | 6/2014 | Carter |
| 2014/0280600 A1 | 9/2014 | Jeon |
| 2015/0067070 A1 | 3/2015 | Jacques et al. |
| 2015/0341297 A1* | 11/2015 | Barfield, Jr. ............ H04L 51/52 709/206 |
| 2015/0352451 A1 | 12/2015 | Brenden et al. |
| 2016/0043987 A1 | 2/2016 | Ahn et al. |
| 2016/0055571 A1 | 2/2016 | Wouhaybi et al. |
| 2016/0127500 A1 | 5/2016 | Rad |
| 2016/0307259 A1 | 10/2016 | Lubeck et al. |
| 2017/0127123 A1 | 5/2017 | Lidow et al. |
| 2017/0142482 A1 | 5/2017 | Zhou |
| 2017/0351770 A1 | 12/2017 | Ahn et al. |
| 2018/0046946 A1 | 2/2018 | Mason et al. |
| 2018/0048597 A1 | 2/2018 | Li et al. |
| 2018/0349703 A1 | 12/2018 | Rathod |
| 2019/0370556 A1 | 12/2019 | Kline et al. |
| 2020/0110788 A1 | 4/2020 | Ahn et al. |
| 2020/0145609 A1 | 5/2020 | Ahn et al. |
| 2020/0226193 A1 | 7/2020 | Ahn et al. |
| 2021/0011966 A1 | 1/2021 | Ahn et al. |
| 2021/0065314 A1 | 3/2021 | Storment et al. |
| 2021/0067362 A1 | 3/2021 | Ahn et al. |
| 2021/0075883 A1 | 3/2021 | Ahn et al. |
| 2021/0182536 A1 | 6/2021 | Ahn et al. |
| 2021/0266498 A1 | 8/2021 | Ahn et al. |
| 2022/0092140 A1 | 3/2022 | Ahn et al. |

FOREIGN PATENT DOCUMENTS

| | | |
|---|---|---|
| CN | 105247845 A | 1/2016 |
| CN | 105308638 A | 2/2016 |
| EP | 2849411 A1 | 3/2015 |
| JP | 2002109025 A | 4/2002 |
| JP | 2005018358 A | 1/2005 |
| JP | 2005092897 A | 4/2005 |
| JP | 2005136524 A | 5/2005 |
| JP | 2006197002 A | 7/2006 |
| JP | 2008022109 A | 1/2008 |
| JP | 2008245113 A | 10/2008 |
| JP | 2011077909 A | 4/2011 |
| JP | 2011081575 A | 4/2011 |
| JP | 2013020485 A | 1/2013 |
| JP | 2015517153 A | 6/2015 |
| JP | 2015519852 A | 7/2015 |
| JP | 2016076078 A | 5/2016 |
| JP | 2016152521 A | 8/2016 |
| JP | 2017045342 A | 3/2017 |
| JP | 2017138948 A | 8/2017 |
| JP | 2018077590 A | 5/2018 |
| JP | 2018120461 A | 8/2018 |
| JP | 2019088004 A | 6/2019 |
| JP | 2019149057 A | 9/2019 |
| KR | 20000054824 A | 9/2000 |
| KR | 20030094156 A | 12/2003 |
| KR | 1020050111838 A | 11/2005 |
| KR | 20060056680 A | 5/2006 |
| KR | 20090014473 A | 2/2009 |
| KR | 20090065147 A | 6/2009 |
| KR | 20100023465 A | 3/2010 |
| KR | 20110035651 A | 4/2011 |
| KR | 20130012155 A | 2/2013 |
| KR | 20130057936 A | 6/2013 |
| KR | 20140087175 A | 7/2014 |
| KR | 20150010988 A | 1/2015 |
| KR | 20150029772 A | 3/2015 |
| KR | 20150055634 A | 5/2015 |
| KR | 1020150056504 A | 5/2015 |
| KR | 101700115 B1 | 1/2017 |
| KR | 20190077654 A | 7/2019 |
| KR | 20190080377 A | 7/2019 |
| WO | 0167760 A1 | 9/2001 |
| WO | 2013081345 A1 | 6/2013 |
| WO | 2015036817 A1 | 3/2015 |
| WO | 2017080169 A1 | 5/2017 |

OTHER PUBLICATIONS

Extended European Search Report for European Application No. 20195016.9, Search completed Nov. 20, 2020, dated Dec. 3, 2020, 9 Pgs.

Extended European Search Report for European Application No. 20214672.6, Search completed Mar. 12, 2021, dated Mar. 24, 2021, 10 Pgs.

First Office Action of corresponding Korean Patent Application 10-2016-0069563, dated Dec. 8, 2016, 9 Pgs.

International Search Report and Written Opinion for International Application No. PCT/KR2018/001315, Search completed May 16, 2018, dated May 17, 2018, 11 Pgs.

Japanese Office Action for Application No. 2020-137009, dated Aug. 12, 2021, 9 pgs.

Japanese Office Action for Application No. 2020-208565 dated Dec. 22, 2021, 3 pages.

Korean Office Action for Application No. 10-2019-0104869, dated Jul. 21, 2020, 10 Pgs.

Korean Office Action for Application No. 10-2019-0111491, dated Aug. 24, 2020, 11 Pgs.

Korean Office Action for Application No. 2020-085492051, dated Dec. 7, 2020, 6 pgs.

Office Action of corresponding Chinese Patent Application No. 2017-10407120.7, dated Aug. 5, 2019, 16 Pgs.

Bao et al., "CVAE-GAN: Fine-Grained Image Generation through Asymmetric Training", arXiv: 1703.10155v1 [cs.CV], Mar. 29, 2017, 15 pgs.

Iyengar et al., "Koinophilia and human facial attractiveness", Resonance—Journal of Science Education, Indian Academy of Sciences, India, vol. 20, No. 4, May 3, 2015 (May 3, 2015), pp. 311-319.

* cited by examiner 610    620    630    640

SERVER AND OPERATING METHOD THEREOF

CROSS-REFERENCE TO THE RELATED APPLICATION

This application claims priority from Korean Patent Application No. 10-2018-0026935, filed on Mar. 7, 2018, the disclosure of which is incorporated herein in its entirety by reference.

BACKGROUND

1. Field

The disclosed embodiments relate to a server and an operating method thereof, providing video call mediating service between a plurality of terminals.

2. Description of the Related Art

As communication technologies develop and electronic devices become miniaturized, personal terminals are coming into wide use for general consumers. Especially, in recent days, portable personal terminals such as smart phones and smart tablet PCs are becoming widely used. Most of the terminals include communication functions. Using these terminals, a user may search the Internet or exchange messages with other users.

Also, as miniature camera technologies, miniature microphone technologies, miniature display technologies and miniature speaker technologies develop, most terminals such as smart phones include camera, microphones, display and speakers. A user may record sound and take videos including voices by using these terminals. A user may listen to recorded sound by using speakers of a terminal or watch videos through display of the terminal.

Also, a user may share recorded sound and videos with other users by using communication function of a terminal. A user may transfer recorded sound and videos to other users. Moreover, a user may record sound and videos and transfer them to other users simultaneously.

Also, at the same time, the other users may record sound and videos and transfer them to the user simultaneously. A display of a terminal may display videos being taken by the terminal or videos being taken by the other user's terminal. Also, speakers of a terminal may play sound being recorded by the other user's terminal simultaneously. That is, each of a user and another user may video calling by using their terminals.

A user and the others may know each other or not. A plurality of terminals including terminals of a user and another may be connected to a server. The sever may mediate between the terminals of a user and another. Thus, a user and another may video call each other through mediation of the server even if they have no relationship with each other.

SUMMARY

According to the disclosed embodiments, there may be provided a server and an operating method thereof capable of improving the match satisfaction of a user of a terminal during a video call.

An operating method of a server according to an embodiment includes mediating, to each of a plurality of first terminals included in a plurality of terminals which transmitted video call mediating request, a video call session between the first terminal and a second terminal selected from a plurality of the terminals, where the second terminal is different from the first terminal; receiving satisfaction information on the video call session of a user of the first terminal from the each of a plurality of the first terminals; preparing, to each of a plurality of the first terminals, combination of specific type of personal information of a user of the first terminal and facial characteristic information of a user of the second terminal which is corresponding to the first terminal; calculating a correlation between the combination and the satisfaction information which is corresponding to the combination; receiving a video call mediating request from a third terminal and a plurality of candidate terminals, and predicting satisfaction information of a user of the third terminal for each of a plurality of the candidate terminals by using specific type of personal information on a user of the third terminal, information on facial characteristics of each users of a plurality of the candidate terminals and the calculated correlation; and choosing a fourth terminal among a plurality of the candidate terminals by using the prediction results, and mediating a video call session between the third terminal and the fourth terminal.

An operating method of a server according to an embodiment includes establishing video call session between at least one first terminals and at least one second terminals; receiving satisfaction index information of users of the at least one first terminals for users of the at least one second terminals, generated through the video call session from the at least one first terminals; calculating a correlation between the satisfaction index information and a combination of specific type of personal information of users of the at least one first terminals and facial information of users of the second terminals; predicting satisfaction of a user of a third terminal for users of a plurality of terminals by using the calculated correlation and a combination of the specific type of personal information of a user of the third terminal which requested for a new video call session and facial information of users of a plurality of the terminals; and choosing a counterpart for a match of the third terminal among the users of a plurality of the terminals by using the prediction results.

As an embodiment, the satisfaction index information corresponds to satisfaction for a match of users of the at least one first terminals for users of the at least one second terminal, wherein the satisfaction for a match is calculated through the video call session from the at least one first terminals.

As an embodiment, the choosing a counterpart for a match of the third terminal among users of a plurality of the terminals by using the prediction results comprises, choosing a user corresponding to the highest satisfaction value among satisfactions of a third user predicted for each users of a plurality of the terminals.

As an embodiment, the satisfaction index information corresponds to at least one satisfaction factors of users of the at least one first terminals for users of the at least one second terminals received through the video call session from the at least one first terminals.

As an embodiment, the calculating a correlation between the combination and the satisfaction index information comprises, calculating a correlation between the combination and the at least one satisfaction factors.

As an embodiment, the predicting satisfaction of a user of the third terminal comprises, predicting at least one satisfaction factors of the user of the third terminal for each user of a plurality of the terminals by using the combination and the correlation; and calculating satisfaction for a match of user of the third terminal for each user of a plurality of the terminals by using the at least one of the predicted satisfaction factors.

As an embodiment, the choosing a counterpart for a match of the third terminal comprises, choosing a user corresponding to the highest match satisfaction value among match satisfactions calculated for each user of a plurality of the terminals.

As an embodiment, the specific type of personal information corresponds to nationality or age of users of the at least one of the first terminals.

As an embodiment, the facial information of users of the plurality of terminals corresponds to facial image of each users of a plurality of the terminals.

As an embodiment, the facial information of users of a plurality of the terminals corresponds to feature point distribution information corresponding to coordinate information of a specific point of each face of the users of a plurality of the terminals.

A server according to an embodiment includes, a controller establishing video call session between each of at least one first terminals and at least one second terminals; and a communication unit receiving satisfaction index information of users of the at least one first terminals for the at least one second terminals, generated through the video call session from the first terminals, wherein, the communication unit calculates correlation between the satisfaction index information and a combination of specific type of personal information of users of the at least one first terminals and facial information of users of the second terminals, predicts satisfaction of a user of a third terminal for users of a plurality of terminals by using the correlation and a combination of the specific type of personal information or the user of the third terminal which requested a new video call session and facial information of users of a plurality of the terminals, and chooses a counterpart for a match of the third terminal among the users of a plurality of the terminals by using the predicted results.

As an embodiment, the controller calculates a correlation between the satisfaction index information and a combination of nationality information of users of the at least one first terminals and facial information of users of the second terminals when the specific type of personal information of users of the at least one first terminals is the nationality information, and predicts satisfaction of the user of the third terminal for users of a plurality of the terminals by using the correlation and a combination of the nationality information of user of the third terminal which requested for a new video call session and facial information of users of a plurality of the terminals.

As an embodiment, the controller calculates a correlation between the satisfaction index information and a combination of age information of users of the at least one first terminals and facial information of users of the second terminals when the specific type of personal information of users of the at least one first terminals is the age information, and predicts satisfaction of user of the third terminal for users of a plurality of the terminals by using the correlation and a combination of the age information of the user of the third terminal which requested for a new video call session and facial information of users of a plurality of the terminals.

As an embodiment, the controller chooses a user corresponding to the highest match satisfaction value among match satisfactions calculated for each user of a plurality of the terminals.

DETAILED DESCRIPTION

Figure 1:
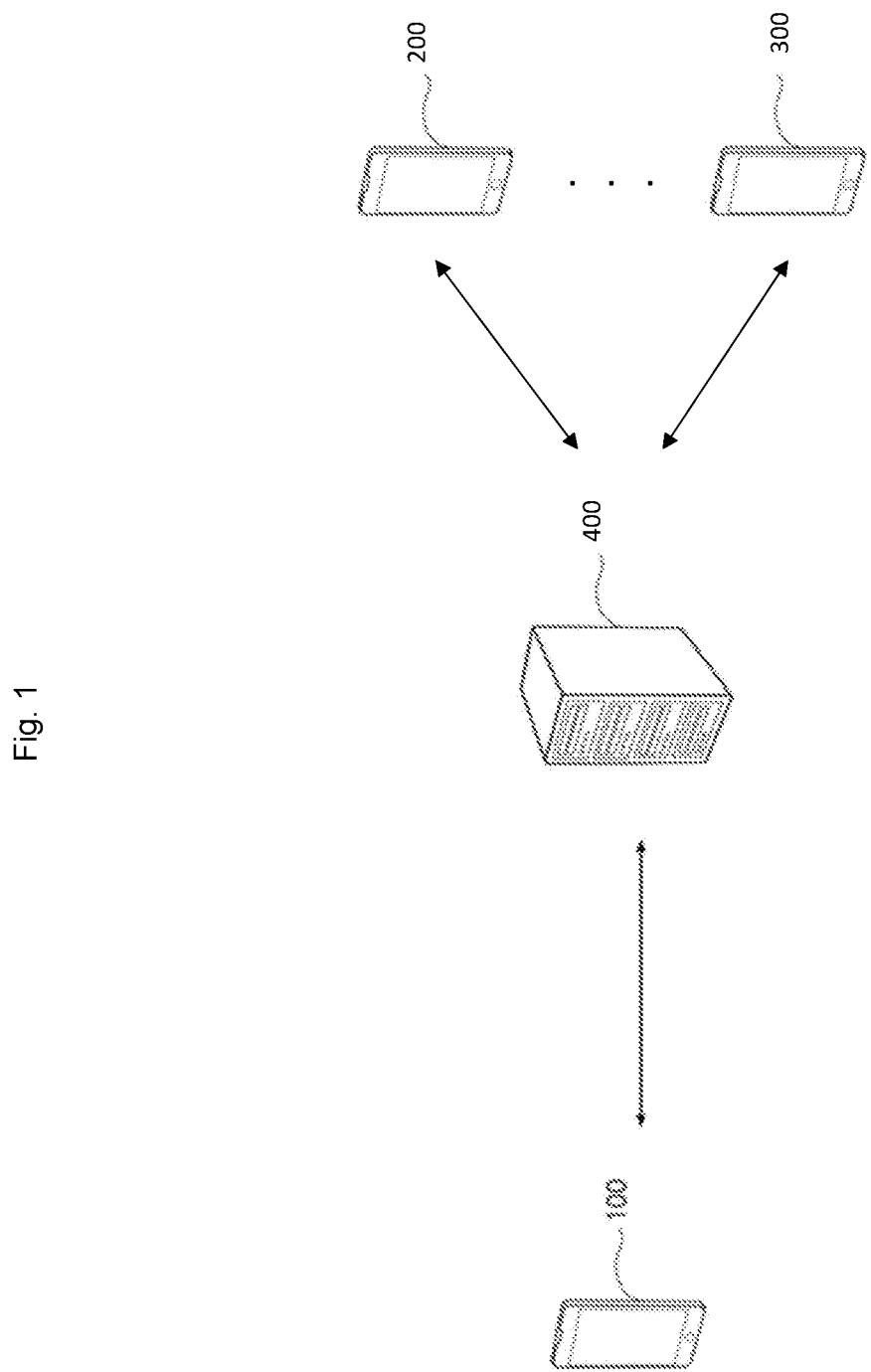
FIG. 1 is a network configuration diagram illustrating an environment where an electronic device operates according to an embodiment.

The advantages and characteristics of the present disclosure, and the method for achieving those advantages and characteristics will be clarified with reference to the embodiments that will be explained hereinafter together with the drawings attached hereto. However, the present disclosure is not limited to the embodiments disclosed hereinafter, but may be realized in various different forms, and the present embodiments are provided merely for the purpose of complete disclosure of the present disclosure, and for the purpose of informing a person skilled in the art of the scope of the present disclosure, and the present disclosure is to be defined only by the scope of the claims. Like reference numerals indicate like configurative elements through the entirety of the specification.

Even though "a first" or "a second" and the like are used to describe various configurative elements, these configurative elements are not limited by the aforementioned terms. The aforementioned terms can only be used to differentiate one configurative element from other configurative elements. Therefore, a first configurative element mentioned hereinafter may be a second configurative element within the technical idea of the present disclosure.

The terms used in the present specification were used to explain the embodiments, and not to limit the present disclosure. In the present specification, a singular form includes plural forms unless specially mentioned otherwise. "Comprises" or "comprising" used in the present specification imply that the mentioned configurative element or step does not exclude the presence or addition of one or more other configurative element or step.

Unless defined otherwise, all the terms used in the present specification may be construed to mean what may be commonly understood by a person skilled in the art. Further, the terms defined in generally used dictionaries should not be construed ideally or overly unless clearly defined specially.

FIG. 1 is a network configuration diagram illustrating an environment where an electronic device operates according to an embodiment. Referring to FIG. 1, the environment where a plurality of electronic devices 100-300 may include server 400 and a plurality of electronic devices 100-300.

Each of the plurality of electronic devices 100-300 may be connected via the server 400. For convenience of explanation, three electronic devices are illustrated in FIG. 1. However, the number of the electronic devices is not limited to three. Each of the plurality of electronic devices may be implemented as one of a desktop computer, a laptop computer, a smart phone, a smart tablet, a smart watch, a mobile terminal, a digital camera, a wearable device, or a mobile electronic device. Each of the plurality of electronic devices 100-300 may execute a program or an application.

Each of the plurality of electronic devices 100-300 may be connected to communication network. Each of the plurality of electronic devices 100-300 may be connected to each other through the communication network or to the server 400. Each of the plurality of electronic devices 100-300 may output data to other connected devices or receive data from other devices.

The communication network connected to each of the plurality of electronic devices 100-300 may include a wired communication network, a wireless communication network, or a composite communication network. The communication network may include a mobile communication network such as 3G, Long Term Evolution (LTE), or LTE-A. The communication network may include a wired or wireless communication network such as Wi-Fi, Universal Mobile Telephone System/General Packet Radio Service (UMTS/GPRS), or Ethernet. The communication network may include a short-range communication network such as Magnetic Secure Transmission (MST), Radio Frequency Identification (RFID), Near Field Communication (NFC), Zigbee, Z-Wave, Bluetooth, Bluetooth Low Energy (BLE), or InfraRed (IR) communication. The communication network may include Local Area Network (LAN), Metropolitan Area Network (MAN), or Wide Area Network (WAN).

Two electronic devices connected to each other among the plurality of electronic devices 100-300 may exchange messages, files, sound data, images, or videos with each other. The two electronic devices connected to each other may establish a voice call session or a video call session. The video call session may be established by using Transmission Control Protocol (TCP), User Datagram Protocol (UDP), or Web Real-Time Communication (WebRTC), etc., for example. Each user of the two electronic devices connected to each other may perform voice call or video call with each other.

The plurality of electronic devices 100-300 may have a video call function. For example, the video call function may be provided in each of the plurality of electronic devices 100-300 in a form of a video call application. Each user of the plurality of electronic devices 100-300 may perform video call with other counterparty by using the video call function by executing the provided application.

For example, a first user of a first electronic device 100 may request the server 400 for a video call connection to a user of a second electronic device 200 by executing the video call application. The server 400 which received the request may check communication status of the second electronic device 200 and may establish a session for a video call between the first electronic device 100 and the second electronic device 200.

The first user of the first electronic device 100 may request the server 400 for a video call connection to a random user by executing the video call application. The server 400 which received the request may randomly choose a second terminal 200 and may establish a session for a video call between the first terminal 100 and the second terminal 200.

The first user of the first terminal 100 may use video call service with a random user by executing video call application. Now, satisfaction for a match of the first user for a random user of electronic device may be determined in a various way, the determined satisfaction for a match may be transmitted to the server 400 and be used for studying matching results.

Hereinafter, an electronic device and a terminal may be used in a same meaning for convenience for explanation.

Figure 2:
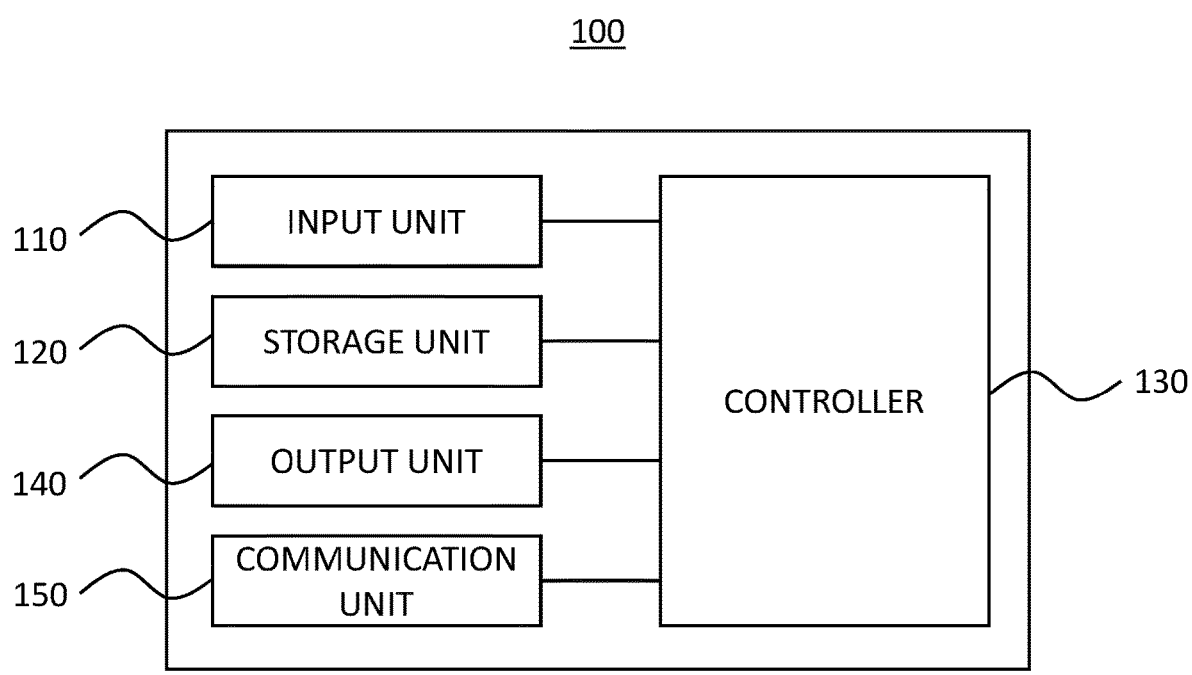
FIG. 2 is a block diagram illustrating a terminal according to an embodiment.

FIG. 2 is a block diagram illustrating a terminal according to an embodiment. Referring to FIG. 2, a first terminal 100 may include input unit 110, storage unit 120, controller 130, output unit 140 and communication unit 150. Each of a second terminal 200 and a third terminal 300 may be implemented similar or same to the first terminal 100.

The input unit 110 may receive signals from the exterior. The input unit 110 may receive signals from a user of the terminal 100. In addition, the input unit 110 may receive signals from external devices. The input unit 110 may include a microphone, a camera, a keyboard, a mouse, a trackball, a touchscreen a button, a switch, a sensor, a network interface, or other input devices, etc., for example. The input unit 110 may receive sound from exterior through a microphone included in the i unit 110. In addition, the input unit 110 may receive facial video of a user, images taken by a camera included in the input unit 110 or receive gestures from the user.

The storage unit 120 may store data. The storage unit 120 may store facial video of a user, sound, or image data received from the input unit 110. Also, the storage unit 120 may store calculation results performed by the controller 130. For example, the storage unit 120 may store sound encoded by the controller 130. The storage unit 120 may store data to be output to the exterior through the controller 130 or store data received from the exterior through the controller 130.

The storage unit 120 may store software or programs. For example, the storage unit 120 may store a various kind of data such as an application, an Application Programming Interface (API), etc. The storage unit 120 may store instructions executable by the controller 130.

The storage unit 120 may include a volatile memory or non-volatile memory. The storage unit 120 may include at least one of flash memory, Read Only Memory (ROM), Random Access Memory (RAM), Electrically Erasable ROM (EEROM), Erasable Programmable ROM (EPROM), Electrically Erasable Programmable ROM (EEPROM), Hard Disk Drive (HDD) and register, for example. The storage unit 120 may include file system, database, and embedded database etc., for example.

The controller 130 or each component included in the controller 130 may be implemented in a form of software or hardware. For example, the software may be implemented by program executing instructions such as machinery code, firmware code, embedded code, and an application etc. The hardware may be an electrical-electronical circuit, a processor, a computer, a pressure sensor, an inertial sensor, Micro-Electro-Mechanical System (MEMS), passive elements, or a combination thereof.

The controller 130 may control the operation of the terminal 100. The controller 130 may be connected to each component included in the terminal 100. The controller 130 may control the operation of each component included in the terminal 100. The controller 130 may control the operation of the terminal 100 in response to signals received by the input unit 110.

The controller 130 may receive facial image of the user taken by the input unit 110. The controller 130 may generate feature point distribution information by using the facial image of the user. The feature point distribution information may include coordinate information on at least one specific point of the user's face. For example, the feature point distribution information may include information on coordinate of each point corresponding to eyes, nose, mouth, eyebrows, and cheekbones of the user's face. The feature point distribution information may include coordinate information corresponding to various points of the user's face. Feature point distribution information achieved from the user's image may be output to the server 400 by the communication unit 140. A method by which the controller 130 achieves the feature point distribution information may be described with reference to FIG. 3.

Figure 3:
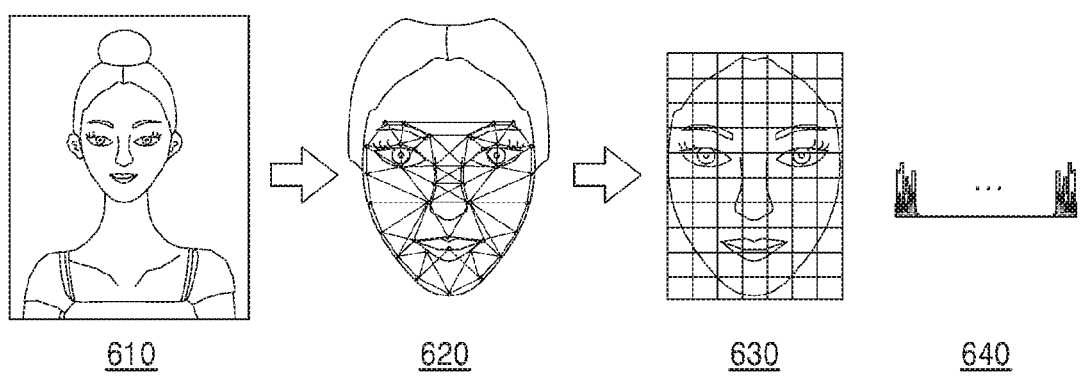
FIG. 3 is a drawing illustrating feature point distribution information achieved from user's facial image according to an embodiment.

FIG. 3 is a drawing illustrating feature point distribution information achieved from user's facial image according to an embodiment. The controller 130 of the first terminal 100 may extract facial feature points of the first user's face from the image of the first user.

Referring to reference numeral 610 of FIG. 3, the controller 130 may extract feature points corresponding to at least one region coordinate information of the eye region, nose region, mouth region, forehead region, jaw region, which are facial regions of the first user, from the image of the first user.

Referring to reference numeral 620 of FIG. 3, the controller 130 may extract only the area of facial region of the first user from the image of the first user.

Referring to reference numeral 630 and 640 of FIG. 3, the controller 130 may achieve feature vector from the feature points in the extracted area of the facial region. The controller 130 may divide the area of the facial region into n×n blocks, and achieve a histogram of gradient direction and size of the pixels belonging each block. The controller 130 may achieve the feature vector from the achieved histogram values. The controller 130 may achieve the feature point distribution information of the first user's face based on the feature vector.

The method of achieving the feature point distribution information of the first user's face described in FIG. 3 is an example, and the feature point distribution information of the first user's face may be achieved by other known methods. For example, the first terminal 100 may achieve the feature point distribution information of the first user's face from the first user's facial image, by combining at least one or more of SIFT, HOG, Haar feature, Ferns, LBP or MCT. The terminals 200, 300 except for the first terminal 100 among the plurality of terminals 100-300 may achieve the feature point distribution information of a face by using the method described with reference to FIG. 3.

Referring to FIG. 2 again, the controller 130 may receive specific type of personal information of the first user through the input unit 110. The specific type of personal information may be information on the birth state of a user input before a video call session is established or age information of the user.

The controller 130 may calculate match satisfaction of the first user with respect to the second user. Here, the 'match satisfaction' may mean satisfaction of the first user with respect to the second user matched by the server 400.

The controller 130 may decide satisfaction factor based on at least one input received from the first user. For example, the controller 130 may decide various satisfaction factors based on information on match duration, whether who is the user that terminated the match, whether the users did text messaging, and the number of messaging, the number of use of the language translation function during the match, the type/frequency/time/ratio of the expression detected from the user's image during the match, whether the first user is in silence, the utterance time of both users during the match/the ratio of the utterance time to the total match time/an average frequency of the voice/an average loudness of the voice/voice tone, the number of times laughter is detected in the sound generated during the match, whether the words related to like or dislike (profanity, etc.) are detected in the sound or text generated during the match, and the number of detection, how much a user moves his or her body during the match, the number of body languages generated during the match, whether the body languages related to like or dislike are detected in the body languages generated during the match, whether a user has made a video call or messaging or friend request after the match, the number of interactions/frequency after users become friends, whether the users have exchanged IDs of other platforms or phone numbers, whether the first user has blocked or reported the counterpart, whether a specific input is received from the first user, etc., received from the first user. Also, the controller 130 may calculated the match satisfaction based on various satisfaction factors.

For example, the controller 130 may calculate the match satisfaction by using following equation 1.

$$s = \sum_{k=1}^{n} p_k f_k \qquad \text{[Equation 1]}$$

In the equation 1 above, k may indicate the number of satisfaction factors, $f_k$ may indicate the satisfaction factor. For example, the satisfaction factor ($f_k$) may be at least one of match duration, whether the users did text messaging, and the number of messaging, the number of use of the language translation function during the match, the number of times laughter is detected in the sound generated during the match, whether the words related to like or dislike are detected in the sound or text generated during the match, and the number of detection, whether the body languages related to like or dislike are detected in the body languages generated during the match, whether a user has made a video call or messaging or friend request after the match, the number of interactions/frequency after users become friends, whether the users have exchanged IDs of other platforms or phone numbers, whether the first user has blocked or reported the counterpart, etc., received from the first user.

Referring to the equation 1 above, the satisfaction factor ($f_k$) may be a factor with respect to whether the first user is interested in the second user. Thus, as the value of the satisfaction factor ($f_k$) is higher the value of the match satisfaction (S) may be higher.

The controller 130 may transmit the calculated match satisfaction (S) to the server 400 via the communication unit 150. Also, the controller 130 may transmit the satisfaction factor ($f_k$) to the server 400 via the communication unit 150 without calculating the match satisfaction. The satisfaction factor ($f_k$) may be corresponding to one of various factors described above.

The output unit 140 may display a screen. The controller 130 may control the output unit 140 to display a screen. The output unit 140 may display a user interface. The output unit 140 may display another screen in response to input from the user.

The output unit 140 may display data. The output unit 140 may display calculation results performed by the controller 130. For example, the output unit 140 may display user image, image of a counterpart of a video call, and/or at least one icon.

The output unit 140 may include flat-panel display apparatus such as Liquid Crystal Display (LCD), Organic Light Emitting Diode (OLED), or Plasma Display Panel (PDP), etc., for example. The output unit 140 may include curved display or flexible display. The output unit 140 may include a touch screen. When the output unit 140 includes a touch screen, the output unit 140 may operate as the input unit 110 while performing an output operation.

The output unit 140 may output sound. The output unit 140 may output sound received through the input unit 110, or through the external device. For example, the output unit 140 may include a speaker.

The communication unit 150 may output data to the exterior or receive data from the exterior. The communication unit 150 may output data to the server 400 or to the external device. The communication unit 150 may receive data from the server 400 or from the external device. The communication unit 150 may output calculation results performed by the controller 130 to the exterior. For example, the communication unit 150 may output facial information including the first user's facial image or the feature point distribution information extracted from the first user's facial image. In addition, the communication unit 159 may output data stored in the storage unit 120 to the exterior.

Data to be output by the communication unit 150 or received data by the communication unit 150 may be stored in the storage unit 120. For example, the communication unit 150 may output messages generated by the controller 130 to the server 400.

The communication unit 150 may include a remote distance network interface such as 3G module, LTE module, LTE-A module, Wi-Fi module, WiGig module, Ultra Wide Band (UWB) module and LAN card, etc., for example. Further, the communication unit 150 may include a short distance network interface such as Magnetic Secure Transmission (MST) module, Bluetooth module, NFC module, RFID module, ZigBee module, Z-Wave module and infrared ray module, etc. Further, the communication unit 150 may include other network interfaces.

Figure 4:
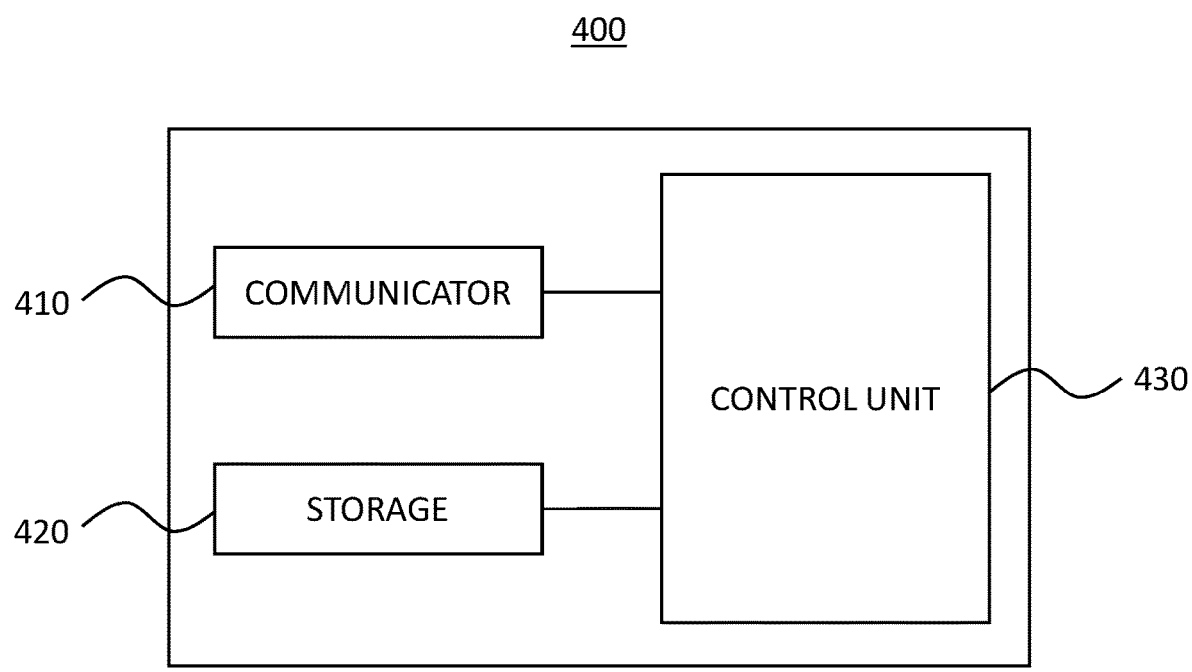
FIG. 4 is a block diagram illustrating configuration of a server according to an embodiment.

FIG. 4 is a block diagram illustrating configuration of a server according to an embodiment. Referring to FIG. 1 and FIG. 4, the server 400 may include a communicator 410, a storage 420 and a control unit 430.

The communicator 410 may output data to the exterior of the server or receive data from the exterior. The communicator 410 may output data to a plurality of terminals 100-300. The communicator 410 may receive data from the plurality of terminals 100-300. The communicator 410 may output calculation results performed by the control unit 430 to the exterior. In addition, the communicator 410 may output data stored in the storage 420 to the exterior.

Data to be output by the communicator 410 or received data by the communicator 410 may be stored in the storage 420. Also, the communicator 410 may transmit information on a learning model learned by the control unit 430 to one of the plurality of terminals 100-300. The communicator 410 may receive specific type of personal information, request for video call connection, user's facial information, match satisfaction, and/or satisfaction factor used for calculating the match satisfaction from each of the plurality of terminals 100-300. The communicator 410 may communicate with the plurality of terminals 100-300 via various wired or/and wireless communication network.

The communicator 410 may include a remote distance network interface such as 3G module, LTE module, LTE-A module, Wi-Fi module, WiGig module, Ultra Wide Band (UWB) module and LAN card, etc., for example. Further, the communicator 410 may include a short distance network interface such as Magnetic Secure Transmission (MST) module, Bluetooth module, NFC module, RFID module, ZigBee module, Z-Wave module and infrared ray module, etc. Further, the communicator 410 may include other network interfaces.

The storage 420 may store program such as an application, an Application Programming Interface (API) etc. and various kind of data. The storage 420 may store instructions executable by the control unit 430. For example, the application may be an application capable of providing video call service between the plurality of terminals 100-300. The storage 420 may store specific type of personal information, facial information, match satisfaction and match satisfaction factor of each user of the plurality of terminals 100-300 received from the plurality of terminals 100-300 through the communicator 410.

The storage 420 may include at least one of volatile memory or non-volatile memory. The storage 420 may include at least one of flash memory, Read Only Memory (ROM), Random Access Memory (RAM), Electrically Erasable ROM (EEROM), Erasable Programmable ROM (EPROM), Electrically Erasable Programmable ROM (EEPROM), Hard Disk Drive (HDD) and register, for example. The storage 420 may include file system, database, and embedded database etc., for example.

The control unit 430 or each component included in the control unit 430 may be implemented in a form of software or hardware. For example, the software may be implemented by program executing instructions such as machinery code, firmware code, embedded code, and an application etc. The hardware may be an electrical-electronic circuit, a processor, a computer, a pressure sensor, an inertial sensor, Micro-Electro-Mechanical System (MEMS), passive elements, or a combination thereof.

The control unit 430 may execute instructions and application stored in the storage 420. For example, the control unit 430, by executing application stored in the storage 420, may select a video call counterpart who is predicted to be more likely to satisfy a user provided specific type of personal information by using a learning model based on the specific type of personal information, request for a video call connection, facial information of a user, match satisfaction, and/or satisfaction factor used for calculating the match satisfaction which are received from each of the plurality of terminals 100-300.

For example, the control unit 430 may have the learning model learn using a deep learning algorithm. The learning model may include at least one of Deep Neural Network (DNN), Convolutional Neural Network (CNN), Recurrent Neural Network (RNN), Region-based Convolutional Neural Network (R-CNN), Restricted Boltzmann Machine (RBM), Deep Belief Network (DBN), or Deep Q-Network. In addition, the learning model may be the Convolutional Neural Network (CNN), or may include AlexNet, ZFNet, GoogLeNet, VGGNet, ResNet, Inception-ResNet, Inception-v2, Inception-v3, or Inception-v4.

The learning model may be a neural network including at least two layers. The learning model may include an input layer and an output layer. The learning model may further include at least one hidden layer.

A method that the control unit 430 selects a video call counterpart for a specific terminal by using the learning model will be described with reference to FIG. 5 to FIG. 8.

Figure 5:
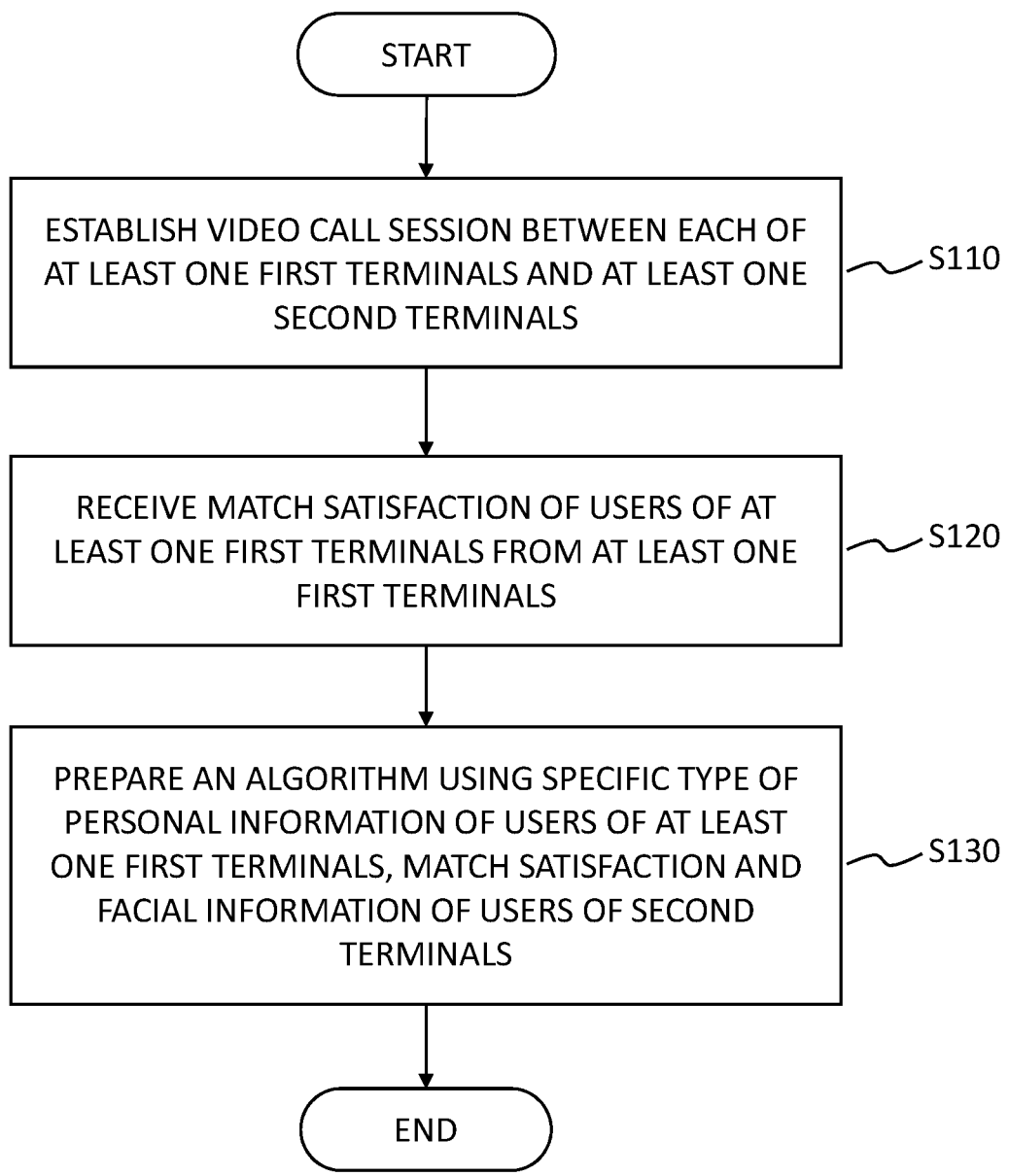
FIG. 5 is a flowchart illustrating an operating method of a server according to an embodiment.

FIG. 5 is a flowchart illustrating an operating method of a server according to an embodiment. Referring to FIGS. 4 and 5, in step S110, the control unit 430 of the server 400 may establish video call session between each of the at least one first terminals and at least one second terminals among the plurality of terminals 100-300. For example, the control unit 430 of the server 400 may randomly select at least one second terminal in response to a request for video call connection or the at least one first terminals.

In step S120, the communicator 410 of the server 400 may receive match satisfaction of the users of the at least one first terminals from the at least one first terminals. The match satisfaction of the users of the at least one first terminals may be a match satisfaction of the users of the at least one first terminals with respect to the at least one second terminals. The match satisfaction may be calculated by the at least one first terminals in a way such as the equation 1.

In step S130, the control unit 430 of the server 400 may prepare an algorithm by using specific type of personal information of the users of the at least one first terminals, match satisfaction and facial information of the users of the second terminals. A method that the control unit 430 of the server 400 prepares the algorithm and selects video call counterpart of the first user will be described with reference to FIG. 6.

Figure 6:
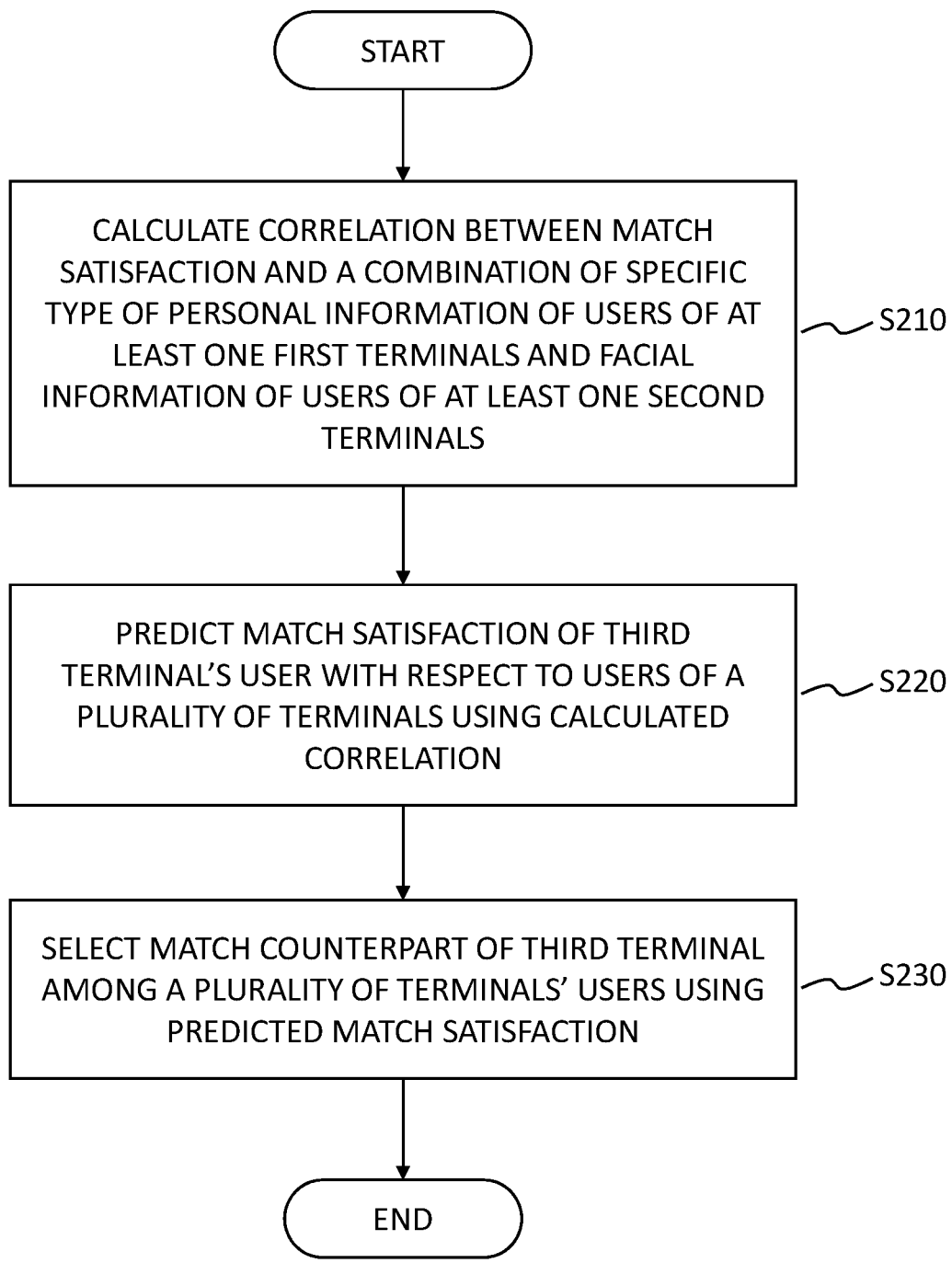
FIG. 6 is a flowchart illustrating a method of a server choosing a video call counterpart according to an embodiment.

FIG. 6 is a flowchart illustrating a method of a server choosing a video call counterpart according to an embodiment. Referring to FIG. 4 to FIG. 6, in step S210, the control unit 430 of the server 400 may calculate a correlation between the match satisfaction and a combination of the specific type of personal information of the users of the at least one first terminals and the facial information of the users of the at least one second terminals. More specifically, the control unit 430 of the server 400 may determine the tendency of the match satisfaction according to the specific type of personal information of the users of the at least one first terminals and the facial information of the users of the at least one second terminals. For example, the calculated correlation may be a learning model learned by using various deep learning algorithm.

For example, the specific type of personal information may correspond to nationality information or age information of users of the at least one first terminals. Also, the facial information of the users of the at least one second terminals may correspond to each facial image of the users of the at least one second terminals or feature point distribution information achieved from each facial image of the users of the second terminals.

For example, when the specific type of personal information of the first user is the nationality information, the control unit 430 of the server 400 may calculate a correlation between match satisfaction and a combination of nationality information of the users of the at least one first terminals and facial information of the users of the at least one second terminals. Also, the control unit 430 of the server 400 may calculate a correlation between match satisfaction and a combination of nationality information of the users of the at least one first terminals and feature point distribution information of the users of the at least one second terminals.

For another example, when the specific type of personal information of the first user is the age information, the control unit 430 of the server 400 may calculate a correlation between match satisfaction and a combination of the age information of the users of the at least one first terminals and facial information of the users of the at least one second terminals. Also, the control unit 430 of the server 400 may calculate a correlation between match satisfaction and a combination of the age information of the users of the at least one first terminals and feature point distribution information of the users of the at least one second terminals.

In step S220, the control unit 430 of the server 400 may predict match satisfaction of a user of a third terminal for users of the plurality of terminals 100-300 by using the calculated correlation and a combination of a specific type of personal information of the user of the third terminal and facial information of the users of the plurality of terminals 100-300, where the third user is the one who requested for a new video call session. For another example, the third terminal may be one of the plurality of terminals 100-300. For another example, the third terminal may be a new terminal other than the plurality of terminals 100-300.

For example, when the specific type of personal information is the nationality information, the control unit 430 of the server 400 may predict match satisfaction of the user of the third terminal for the users of the plurality of terminals 100-300 by using the calculated correlation and a combination of the nationality information of the user of the third terminal and facial information of users of the plurality of terminals 100-300. Also, the control unit 430 of the server 400 may predict the match satisfaction of the user of the third terminal by using the calculated correlation and a combination of the nationality information of the user of the third terminal and feature point distribution information of users of the plurality of terminals 100-300.

For another example, when the specific type of personal information is the age information, the control unit 430 of the server 400 may predict match satisfaction of the user of the third terminal for the users of the plurality of terminals 100-300 by using the calculated correlation and a combination of the age information of the user of the third terminal and facial information of users of the plurality of terminals 100-300. Also, the control unit 430 of the server 400 may predict the match satisfaction of the user of the third terminal by using the calculated correlation and a combination of the age information of the user of the third terminal and feature point distribution information of users of the plurality of terminals 100-300.

In step S230, the control unit 430 of the server 400 may select a match counterpart for the third user based on the predicted satisfaction of the third user. For example, the server 400 may choose a user corresponding to the highest value among the predicted satisfaction for the third user and the users of the plurality of terminals 100-300 as the next counterpart.

Figure 7:
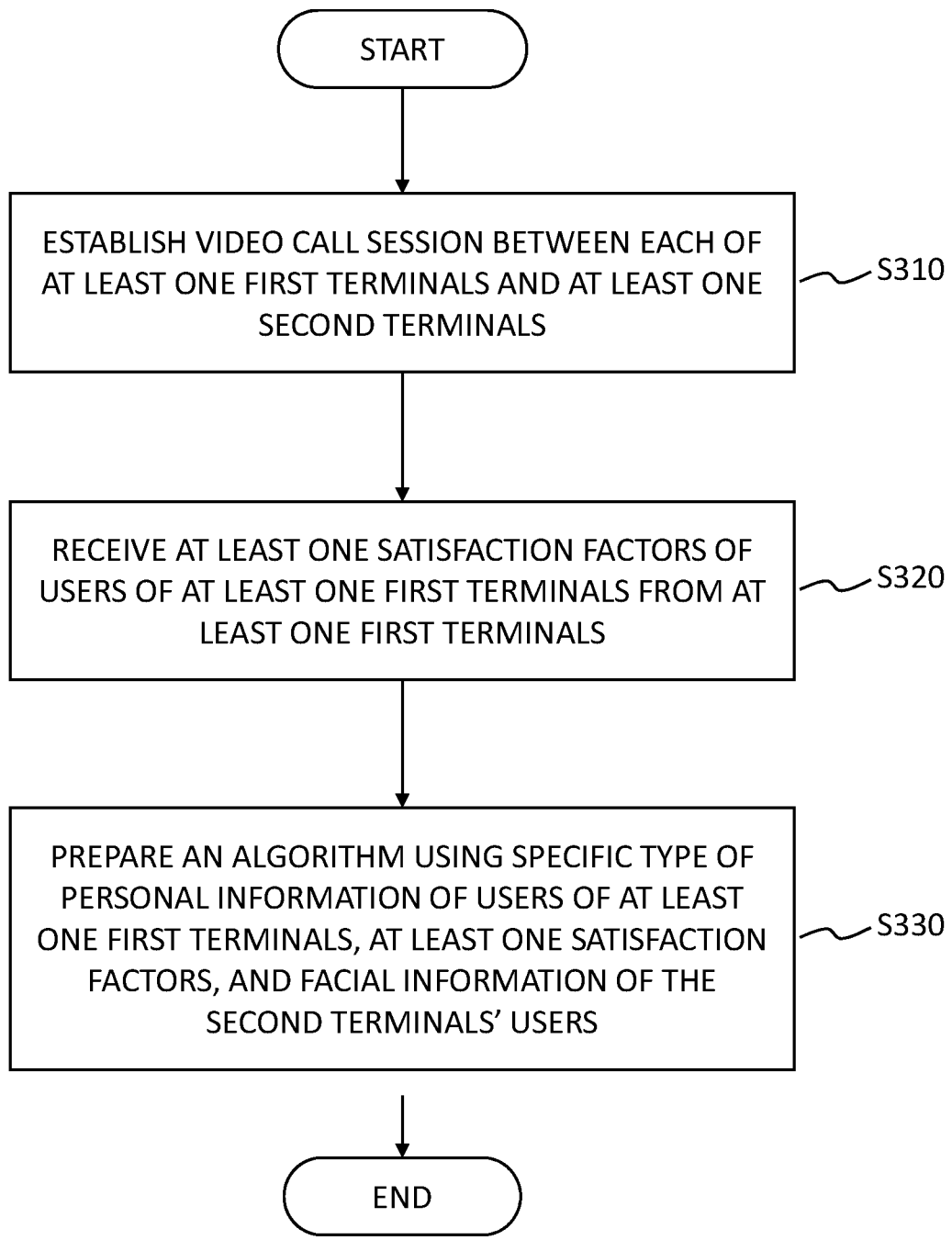
FIG. 7 is a flowchart illustrating an operating method of a server according to another embodiment.

FIG. 7 is a flowchart illustrating an operating method of a server according to another embodiment. Referring to FIG. 4 and FIG. 7, in step S310, the control unit 430 of the server 400 may establish video call session between each of the at least one first terminals and the at least one second terminals of the plurality of terminals 100-300. For example, the control unit 430 of the server 400 may randomly choose at least one second terminals in response to video call connection request from the at least one first terminals.

In step S320, the communicator 410 of the server 400 may receive satisfaction factor of the users of the at least one first terminals from the at least one first terminals. At least one satisfaction factors of the users of the at least one first terminals may be factors generated by the first user during a video call with the second user.

In step S330, the control unit 430 of the server 400 may prepare an algorithm by using specific type of personal information of the users of the at least one first terminals, at least one satisfaction factors and facial information of the users of the second terminals. A method that the control unit 430 of the server 400 prepares the algorithm and selects video call counterpart of the first user will be described with reference to FIG. 8.

Figure 8:
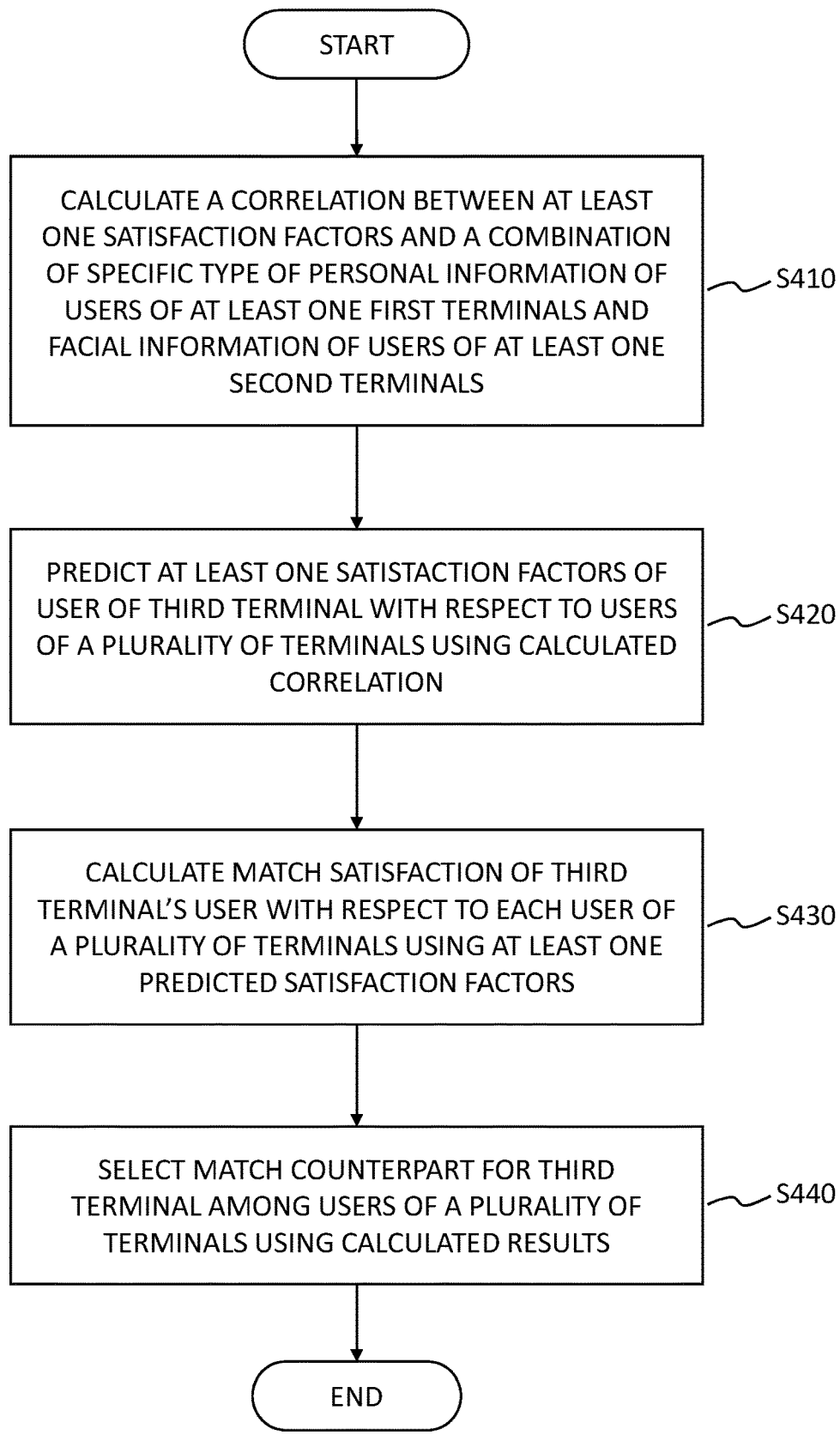
FIG. 8 is a flowchart illustrating a method of a server choosing a video call counterpart according to another embodiment.

FIG. 8 is a flowchart illustrating a method of a server choosing a video call counterpart according to another embodiment. Referring to FIG. 4, FIG. 7, and FIG. 8, in step S410, the control unit 430 of the server 400 may calculate a correlation between the at least one satisfaction factors and a combination of the specific type of personal information of the users of the at least one first terminals and the facial information of the users of the at least one second terminals. More specifically, the control unit 430 of the server 400 may determine the tendency of the least one satisfaction factors according to the specific type of personal information of the users of the at least one first terminals and the facial information of the users of the at least one second terminals. For example, the calculated correlation may be a learning model learned by using various deep learning algorithm.

For example, the specific type of personal information may include nationality information or age information of users of the at least one first terminals. Also, the facial information of the users of the at least one second terminals may include each facial image of the users of the at least one second terminals or feature point distribution information achieved from each facial image of the users of the second terminals.

For example, when the specific type of personal information of the first user is the nationality information, the control unit 430 of the server 400 may calculate a correlation between the at least one satisfaction factors and a combination of nationality information of the users of the at least one first terminals and facial information of the users of the at least one second terminals. Also, the control unit 430 of the server 400 may calculate a correlation between the at least one satisfaction factors and a combination of nationality information of the users of the at least one first terminals and feature point distribution information of the users of the at least one second terminals.

For another example, when the specific type of personal information of the first user is the age information, the control unit 430 of the server 400 may calculate a correlation between the at least one satisfaction factors and a combination of the age information of the users of the at least one first terminals and facial information of the users of the at least one second terminals. Also, the control unit 430 of the server 400 may calculate a correlation between the at least one satisfaction factors and a combination of the age information of the users of the at least one first terminals and feature point distribution information of the users of the at least one second terminals.

In step S420, the control unit 430 of the server 400 may predict at least one satisfaction factors of a user of a third terminal for users of the plurality of terminals 100-300 by using the calculated correlation and a combination of a specific type of personal information of the user of the third terminal and facial information of the users of the plurality of terminals 100-300, where the third user is the one who requested for a new video call session. For example, the third terminal may be one of the plurality of terminals 100-300. For another example, the third terminal may be a new terminal other than the plurality of terminals 100-300.

For example, when the specific type of personal information is the nationality information, the control unit 430 of the server 400 may predict the at least one satisfaction factors of the user of the third terminal for the users of the plurality of terminals 100-300 by using the calculated correlation and a combination of the nationality information of the user of the third terminal and facial information of users of the plurality of terminals 100-300. Also, the control unit 430 of the server 400 may predict the at least one satisfaction factors of the user of the third terminal by using the calculated correlation and a combination of the nationality information of the user of the third terminal and feature point distribution information of users of the plurality of terminals 100-300.

For another example, when the specific type of personal information is the age information, the control unit 430 of the server 400 may predict the at least one satisfaction factors of the user of the third terminal for the users of the plurality of terminals 100-300 by using the calculated correlation and a combination of the age information of the user of the third terminal and facial information of users of the plurality of terminals 100-300. Also, the control unit 430 of the server 400 may predict the at least one satisfaction factors of the user of the third terminal by using the calculated correlation and a combination of the age information of the user of the third terminal and feature point distribution information of users of the plurality of terminals 100-300.

In step S430, the control unit 430 of the server 400 may calculate match satisfaction of the first user for each user of the plurality of terminals 100-300 by using the predicted at least one satisfaction factors. For example, the control unit 430 of the server 400 may calculate match satisfaction of the first user for each user of the plurality terminals 100-300 by using a method such as the equation 1.

In step S440, the control unit 430 of the server 400 may select a match counterpart of the third user based on the calculated third user's satisfaction. For example, the server 400 may select a user corresponding to the highest value among the calculated satisfaction for the third user and the users of the plurality of terminals 100-300 as the next counterpart.

For another example, first, the server 400 may establish video call session between the first terminal and the second terminal where the second terminal is selected from the plurality of terminals and different from the first terminal, for each of the plurality of the first terminals included in the plurality of terminals which transmitted video call mediating request. Next, the server 400 may receive satisfaction information of a user of the first terminal with respect to the video call session from each of the plurality of first terminals.

Next, the server 400 may prepare a combination of the specific type of personal information of a user of the first terminal and information on facial characteristic of a user of the second terminal corresponding to the first terminal, for each of the plurality of first terminals. Next, the server 400 may calculate a correlation between the combination and the satisfaction information corresponding to the combination.

Next, the server 400 may receive video call mediating request from the third terminal and a plurality of candidate terminals. The server 400 may predict satisfaction information of a user of the third terminal with respect to video call session with each of the plurality of candidate terminals by using the specific type of personal information, information on facial characteristic of each user of the plurality of terminals and the calculated correlation.

Next, the server 400 may choose a fourth terminal among the plurality of candidate terminals based on the prediction results and establish video call session between the third terminal and the fourth terminal.

As described with reference to FIG. 1 to FIG. 8, the server 400 may improve the match satisfaction of the user of the terminal by matching the video call counterpart expected to be highly satisfied by the user of the terminal during the video call.

The embodiments described hereinabove may be implemented in a form of recording medium including instructions executable by a computer such as a program module executed by a computer. A computer readable recording medium may be arbitrary fusible media that may be accessed by computers, and may include all volatile and non-volatile media, and separable and non-separable media.

In addition, the computer readable medium may include computer storage media and communication media. The computer storage media may include all volatile and non-volatile, and separable and non-separable media realized by an arbitrary method or technology for storing information such as computer readable commands, data structures, program modules and other data. Communication media include traditional computer readable commands, data structures, program modules, other data of modulated data signals such as carrier waves and other transmission mechanisms and may include arbitrary information transmission media.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the tow. Computer-executable instructions for implementing a method, process, or algorithm described in connection with embodiments disclosed herein can be stored in a non-transitory computer readable storage medium.

Embodiments of the present disclosure were explained with reference to the drawings attached hereto, but a person skilled in the art will understand that the present disclosure may be implemented in other specific forms without changing its technical idea or essential characteristics. Therefore, the embodiments disclosed hereinabove must be understood as exemplary and not limiting the present disclosure in all aspects.

What is claimed is:

1. An operating method of a server, comprising:
   establishing a video call session between at least one first terminal and at least one second terminal;
   receiving satisfaction index information, of a user of the at least one first terminal with respect to a user of the at least one second terminal, generated through the video call session from the at least one first terminal;
   calculating a correlation between the satisfaction index information and a combination of a specific type of personal information about the user of the at least one first terminal and facial information about the user of the at least one second terminal, wherein the facial information about the user of the at least one second terminal includes feature point distribution information calculated based on a facial image of the user of the at least one second terminal;
   predicting satisfaction of a user of a third terminal with respect to users of a plurality of terminals by using the correlation, the correlation being based on the personal information about the user of the at least one first terminal and the facial information about the user of the at least one second terminal, and a combination of a specific type of personal information about the user of the third terminal which requests a new video call session and facial information about the users of the plurality of terminals, wherein the facial information about the users of the plurality of terminals includes feature point distribution information calculated based on facial images of the users of the plurality of terminals; and
   choosing a counterpart for a match of the third terminal among the users of the plurality of terminals by using a result of the prediction.

2. The method according to claim 1, wherein the satisfaction index information corresponds to satisfaction for a match of the user of the at least one first terminal with respect to the user of the at least one second terminal, and
   wherein the satisfaction for the match is calculated through the video call session from the at least one first terminal.

3. The method according to claim 1, wherein the choosing the counterpart for the match of the third terminal among the users of the plurality of terminals by using the result of the prediction comprises choosing a user corresponding to a highest satisfaction value among values of the predicted satisfactions of the user of the third terminal with respect to the users of the plurality of terminals.

4. The method according to claim 1, wherein the satisfaction index information corresponds to at least one satisfaction factor of the user of the at least one first terminal with respect to the user of the at least one second terminal received through the video call session from the at least one first terminal.

5. The method according to claim 4, wherein the calculating the correlation between the satisfaction index information and the combination comprises calculating a correlation between the at least one satisfaction factor and the combination.

6. The method according to claim 5, wherein the predicting the satisfaction of the user of the third terminal comprises:
   predicting at least one satisfaction factor of the user of the third terminal with respect to each user of the plurality of terminals by using the correlation and the combination; and
   calculating satisfaction for a match of the user of the third terminal for each user of the plurality of terminals by using the predicted at least one satisfaction factor.

7. The method according to claim 6, wherein the choosing the counterpart for the match of the third terminal comprises choosing a user corresponding to a highest match satisfaction value among match values of satisfactions calculated for each user of the plurality of terminals.

8. The method according to claim 1, wherein the specific type of personal information comprises information about at least one of a nationality and an age of the user of the at least one first terminal.

9. The method according to claim 1, wherein the facial information about the users of the plurality of terminals comprises information about a facial image of each user of the plurality of terminals.

10. The method according to claim 1, wherein the facial information about the users of the plurality of terminals comprises feature point distribution information corresponding to coordinate information about a specific point of each face of the users of the plurality of terminals.

11. A non-transitory computer-readable recording medium having recorded thereon a program for executing, in a computer the operating method of a server in claim 1.

12. A server comprising:
at least one processor;
memory readable by the at least one processor; and
instructions stored in the memory that when read by the at least one processor direct the at least one processor to perform operations including:
  establishing a video call session between each of at least one first terminal and at least one second terminal,
  receiving satisfaction index information, of a user of the at least one first terminal with respect to the at least one second terminal, generated through the video call session from the at least one first terminal,
  calculating a correlation between the satisfaction index information and a combination of a specific type of personal information about the user of the at least one first terminal and facial information about the user of the at least one second terminal, wherein the facial information about the user of the at least one second terminal includes feature point distribution information calculated based on a facial image of the user of the at least one second terminal,
  predicting satisfaction of a user of a third terminal with respect to users of a plurality of terminals by using the correlation, the correlation being based on the personal information about the user of the at least one first terminal and the facial information about the user of the at least one second terminal, and a combination of a specific type of personal information about the user of the third terminal which requests a new video call session and facial information about the users of the plurality of terminals, wherein the facial information about the users of the plurality of terminals includes feature point distribution information calculated based on facial images of the users of the plurality of terminals, and
  choosing a counterpart for a match of the third terminal among the users of the plurality of terminals by using a result of the prediction.

13. The server according to claim 12, wherein the at least one processor is directed to calculate a correlation between the satisfaction index information and a combination of nationality information about the user of the at least one first terminal and the facial information about the user of the at least one second terminal when the specific type of the personal information of the user of the at least one first terminal is the nationality information, and predicts satisfaction of the user of the third terminal with respect to the users of the plurality of terminals by using the correlation and a combination of nationality information the user of the third terminal and facial information about the users of the plurality of terminals.

14. The server according to claim 12, wherein the at least one processor is directed to calculate a correlation between the satisfaction index information and a combination of age information about the user of the at least one first terminal and facial information about the user of the second terminal when the specific type of the personal information about the user of the at least one first terminal is the age information, and predicts satisfaction of the user of the third terminal with respect to the users of the plurality of terminals by using the correlation and a combination of age information about the user of the third terminal and facial information about the users of the plurality of terminals.

15. The server according to claim 12, wherein the at least one processor is directed to choose a user corresponding to a highest match satisfaction value among values of match satisfaction calculated for the users of the plurality of terminals.

* * * * *